United States Patent [19]

Marini et al.

[11] 4,392,214
[45] Jul. 5, 1983

[54] SOUND-MONITORING DEVICE FOR AN INDUSTRIAL INSTALLATION

[75] Inventors: Jean Marini, Marly le Roi; Bernard Audenard, Orgeval, both of France

[73] Assignee: Framatome, Courbevoie, France

[21] Appl. No.: 235,226

[22] Filed: Feb. 17, 1981

[30] Foreign Application Priority Data

Feb. 12, 1980 [FR] France ............................... 80 03090

[51] Int. Cl.³ .......................... G01S 5/18; G21C 17/00
[52] U.S. Cl. ..................................... 367/127; 73/572; 73/658; 340/683; 376/245
[58] Field of Search ..................... 367/127, 125, 112; 73/572, 658; 340/683; 376/245, 249, 252

[56] References Cited

U.S. PATENT DOCUMENTS

3,262,515  7/1966  Drum ............................. 367/127 X
3,798,626  3/1974  Weichbrodt et al. ........... 340/683 X
4,009,463  2/1977  Vercellotti et al. ............... 367/127
4,066,969  1/1978  Pearce et al. ...................... 367/125

*Primary Examiner*—Richard A. Farley
*Attorney, Agent, or Firm*—Pollock, Vande Sande & Priddy

[57] ABSTRACT

Sound monitoring device for an industrial installation to detect possible impacts of stray bodies including at least one set of two sound detectors arranged in contact with the wall of the installation or in its vicinity, and a measuring and alarm circuit. The detectors are connected to this measuring circuit which includes a device for measuring the separation in time between the reception of the sound waves at one and the other detector, a comparator for this separation with at least one set of two predetermined values, and an alarm which is triggered if the separation in time falls between the two predetermined values. The invention is particularly useful for surveillance of the primary circuit of a pressurized water nuclear reactor.

1 Claim, 3 Drawing Figures

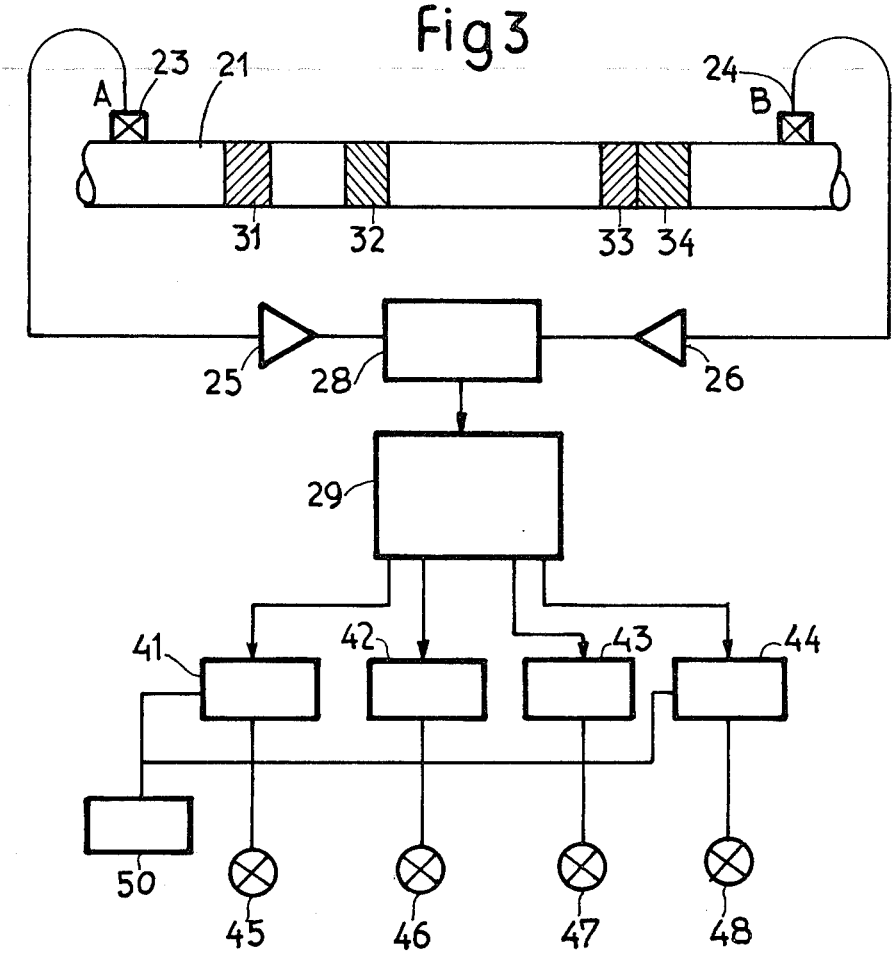

SOUND-MONITORING DEVICE FOR AN INDUSTRIAL INSTALLATION

BACKGROUND OF THE INVENTION

The invention relates to an sound-monitoring device for an industrial installation to detect possible impacts of stray bodies in the installation.

In a nuclear reactor or in any industrial plant comprising a large number of members such as pipes, containers and valves in which fluids are circulating, there exists a risk of the deterioration of the structures of the installation, due to the fact that a mechanical member, such as a bolt, a washer or an element of a valve may be detached to become a stray body moving at high speed in the installation if the fluid itself is flowing at high speed.

In fact, in such installations, an account of the strains to which the parts are subjected in service, local more or less complete ruptures may occur which may develop to the point where the part is detached and drawn by the flow to become a stray body in the installation.

In nuclear reactors in particular, these rupture-causing strains may be of thermal or mechanical origin and their effect may be aggravated by corrosion.

There exist areas of the hydraulic circuits of the above-mentioned installations wherein the stray bodies have a tendency to come into collision with one part of the installation preferentially. For example, in the case of piping including valves, these preferential places may be elbows in the piping, the low points or again the valve bodies.

In the case of pressurized water nuclear reactors, the impact of stray bodies on certain parts of the primary circuit may be particularly dangerous since the flow speeds of the fluids are very high, of the order of 10–15 m per second. Such impacts may hence cause considerable damage in the reactor circuit.

This damage is all the more difficult to repair if the reactor has already operated and when repairs must be carried out in areas subject to radiation from ionizing particles.

It is therefore important to detect such stray bodies very rapidly, from the first impacts on the structure of the circuit, so as to be able in the control room to make the appropriate decisions to avoid serious damage in the reactor.

It has long been known how to detect the impact of two metal parts, using sound detectors positioned on the structure or microphones positioned in the air in the vicinity of the structure subject to the impacts. When acoustic waves produced by a metal on metal impact are detected by detectors or microphones, the emission received is transformed to emit a pulse-type signal.

Consideration has therefore been given to installing, in the vicinity of the areas where the probability of impact is high, sensors which can be positioned also in the vicinity of the parts of which the probability of breakage is high.

In fact, in industrial plants such as nuclear reactors, the sensor may very well respond to other stresses than those which correspond to the phenomenon of shock or of rupture which it is desired to monitor. Noises of very varied source, such as the noise accompanying the closing of the flap of a valve, the movement of the control rods or of other movable members may generate pulse-type acoustic signals which are observed at the terminals of the sensors and which can be taken for signals resulting from an impact between two metal parts in the area being surveyed.

Even using sensors such as acoustic emission piezoelectric sensors whose response frequencies are relatively high (above 50 kHz) and whose sensitivity area is smaller than, for example, those of accelerometers which take into account the low frequency components of the acoustic zones, it is not possible to discriminate effectively between the signals due to the impacts of the stray bodies and the signals due to other causes in other parts of the installation.

In particular, presently known devices do not enable a distinction to be made between a weak acoustic stress whose source is close and a greater stress produced at a great distance.

In the case of nuclear reactors, currently known devices do not permit distinction, for example, between the acoustic waves due to an impact on the bottom of a steam generator, for example, and the closing of a flap valve at very great distance from the area wherein the sensor is located. The exploitation of the recordings of the sensors by an electronic monitoring device including simple counting or recording means is hence not possible since it must take into account the shape of the signals and analyse them with the aid of an oscilloscope.

Moreover, an electrical interference may be observed by the monitoring circuit as an acoustic pulse, which is the cause of false alarms.

SUMMARY OF THE INVENTION

It is hence an object of the invention to provide an acoustic monitoring device for an industrial installation, to detect possible impacts of stray bodies in the installation, using acoustic sensors for the waves emitted on the impacts of the stray bodies, this device enabling account to be taken only of the acoustic signals relating to impacts of stray bodies in the zone under surveillance to the exclusion of any other disturbing acoustic or electrical phenomenon.

To this end, the acoustic device according to the invention comprises at least one group of two acoustic sensors placed in contact with the wall of the installation in its vicinity, at two different points of the installation between which it is desired to effect surveillance and a measuring and alarm circuit to which are connected the sensors, comprising means for measuring the separation in time between the reception of the acoustic waves on the one and on the other sensor, means for comparing this separation with at least one group of two pre-determined values and an alarm means which is triggered if the separation is situated between the two pre-determined values.

In order that the invention may be more fully understood there is described below, by way of non-limiting example, with reference to the accompanying drawings, one embodiment of a device according to the invention used for monitoring a piping portion within which moves a fluid which can contain stray bodies.

BRIEF DESCRIPTION OF THE DRAWINGS

FIG. 3 shows a second embodiment of the device according to the invention diagrammatically and in position on a piping portion and with the possibility of determining the section of the piping in which the impact takes place.

DETAILED DESCRIPTION

Figure 1:
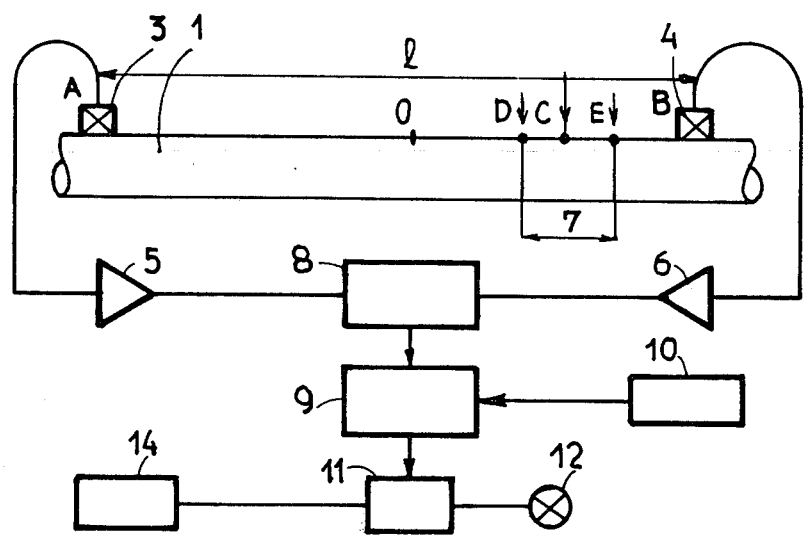
FIG. 1 shows a first embodiment of the device according to the invention in diagrammatic view and in position on the piping portion.

In FIG. 1 is seen a piping portion 1 on which are positioned at two places, separated by a length 1 of the piping, two sound detectors 3 and 4 connected to the measuring and alarm system through amplifiers 5 and 6 respectively.

By O is denoted the middle point of the piping between the sound detectors 3 and 4, by C the center of a zone 7 of the piping which it is desired to monitor and by D and E the end points of this zone placed under surveyance.

When an impact occurs at point C, a sound wave is generated, and is propagated in the piping with a known constant speed depending on the material constituting the piping.

Even if the wave system created at the moment of impact is complex and various types of waves are then generated (longitudinal wave, transverse wave, Lamb's wave, or surface wave), all occurs at a certain distance from the impact as if the acoustic vibration were propagated at the speed of surface waves.

In the case of steel piping, the speed of the surface waves is about c=3,000 m per second.

For all points of the segment comprised between the sensors 3 and 4, it is possible to define a transit time difference $$\Delta t1.2 = t1 - t2 \text{ or } \Delta t2.1 = t2 - t1,$$

the point at which $\Delta t1.2 = \Delta t2.1 = 0$ being situated at the center O of the piping segment.

If the points of the piping where the sensors 3 and 4 are positioned are denoted by A and B, respectively, then:

$$t1 = CA/c \text{ and } t2 = CB/c$$

The measuring and alarm system comprises a device 8 enabling measurement of the difference in arrival time of the sound waves coming from the sensor 3 and from the sensor 4, the detected signals being amplified at the level of the amplifier devices 5 and 6, respectively.

Figure 2:
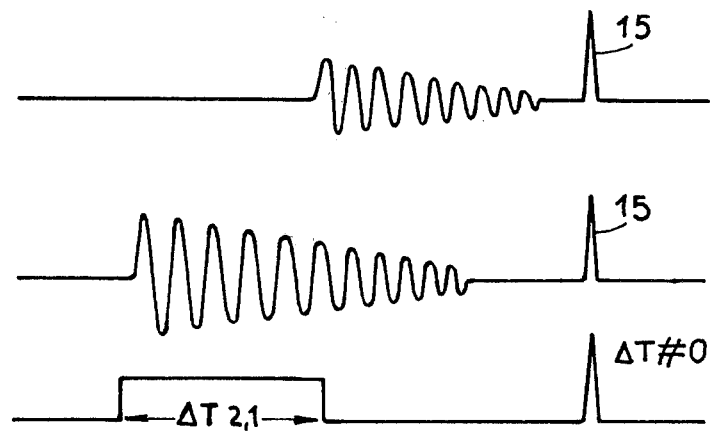
FIG. 2 shows the signals received at each of the sensors and the signal representing the separation in time between the reception of the acoustic waves at one and at the other sensor.

In FIG. 2 diagramatically shows the sound wave received by the sensor 3, the sound wave received by the sensor 4 and the signal emitted by the measuring device from the difference in time of arrival 8. The signal representing the difference in time of arrival $\Delta t$ is received by a comparator 9 which also receives signals representing two values of $\Delta t$ ($\Delta t$ mini and $\Delta t$ maxi) through a separation adjusting device 10.

The values of $\Delta t$ mini and $\Delta t$ maxi correspond to the separation between the impact signals at point D and at point E, respectively, these points defining the zone 7 within which the acoustic monitoring is carried out.

The comparator 9 emits a signal when the $\Delta t$ measured is situated between $\Delta t$ mini and $\Delta t$ maxi, this signal giving rise at the level of the counting and display device 11 to the printing of a message corresponding to the presence of an impact in the monitored zone.

Simultaneously an alarm 12, for example a signal lamp, enables the presence of the impact to be fully displayed.

A clock 14 enables the various impacts to be time recorded very accurately.

The choice of the position of the sensors 3 and 4 on the piping, with respect to the zone 7 which is under surveillance, is selected so that the sensitivity of the surveillance is the maximum. A centered position of the segment D, E with respect to the point A, B where the sensors 3 and 4 are located is avoided, since then the values of $\Delta t$ in the zone under survey would be nil or very small, which would not permit them to be distinguished from electrical interference for which $\Delta t$, as seen in FIG. 2 is nil.

In fact, the appearance of an electrical interference 15 in the signals received by the sensors 3 and 4 is simultaneous, whereas the sound signals received by the sensors are separated in time by a period $\Delta t$.

By the choice of the position of the sensors, it is hence possible to recognize positively the signals due to impacts in the zone under survey.

Referring to FIG. 3, a piping portion 21 is seen in which have been positioned, sound sensors 23 and 24 connected to a measuring circuit through amplifiers 25 and 26.

As previously, the measuring circuit includes a measuring device 28 for the separation in time between the reception of the signals on one and the other sensor and a comparator 29 receiving the values of $\Delta t$ mini and $\Delta t$ maxi (for 4 areas instead of only one in this case, however).

Moreover, according to the interval $\Delta t$ mini $\Delta t$ maxi in which the $\Delta t$ measured was marked, the comparator 29 transmits the signal to a counting and display device corresponding to zone 31, 32, 33 or 34 whose interval 4 $\Delta t$ mini–$\Delta t$ maxi encompasses the value of $\Delta t$ measured.

The measuring and display circuit hence comprises four counting and display units 41, 42, 43 and 44 and four signal lamps 45, 56, 47, and 48.

Also, as previously, a clock 50 enables the impact recorded at the level of the various monitored zones to be dated.

It is seen that the principal advantages of the devices according to the invention are to permit full discrimination between the signals arising from impacts in a precise monitored zone and interfering signals, the extremely easy positioning in an industrial installation, from the moment when this installation has a certain linear structure, and of permitting more accurate localization of impacts in the monitored zones situated between the two sensors.

However the invention is not limited to the embodiment which has just been described, it encompasses, on the contrary, all modifications.

Thus, it is possible to place under surveillance any number of zones positioned between the two sensors, it is possible even to effect surveillance over the whole plant area comprised between the two sensors, with the exclusion, however of the central portion equidistant from the two sensors from which an accurate discrimination of the signals would not be possible.

It is possible to use sound detectors of any type whether they are of the accelerometer type or the piezo-electric type, from the moment when there is associated with these detectors a device for measuring the difference in time of the arrival of the signals which is compatible with these detectors.

It is possible to use any alarm device, whether this is a luminous or sound alarm or only a recording with or without simultaneous automatic action on a control device.

Finally, the monitoring device according to the invention may be used not only in the case of piping, but in an entire industrial installation having at least a partially linear structure, whether traversed or not by a fluid at high speed.

Nonetheless, the invention finds preferential application in the case of an installation of linear form traversed by a fluid at high speed, such as a portion of the primary circuit of a pressurized water nuclear reactor.

We claim:

1. Sound monitoring device for detecting possible impacts of stray bodies in an industrial installation, using sound sensors for waves emitted on impacts of said stray bodies and comprising (a) first and second acoustic sensors arranged adjacent to the wall of said installation at two different points the interval between which is to be monitored; and
   (b) a measuring and alarm circuit to which said sensors are connected, comprising
      (i) means for measuring the separation in time between the reception of the sound waves at said first and second sensors, respectively; and
      (ii) means for comparing said separation with at at least two sets of two predetermined values corresponding to the ends of at least two monitoring zones; and
      (iii) alarm means which is triggered if said separation in time falls between two predetermined values corresponding to one of said monitoring zones.

* * * * *